Aug. 12, 1947.   G. R. McINTOSH   2,425,631
MOTOR VEHICLE
Original Filed Oct. 3, 1942   2 Sheets-Sheet 1
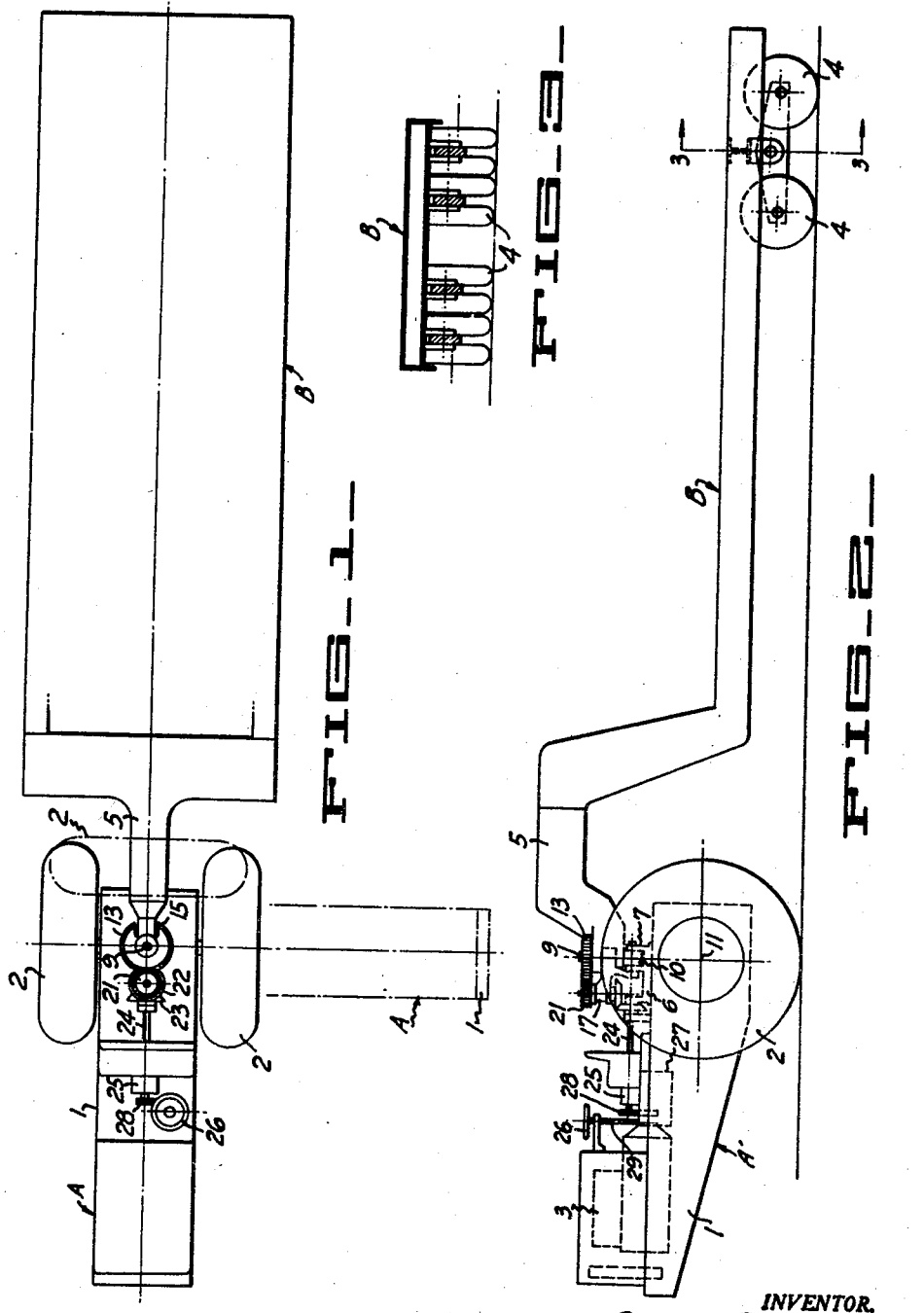
INVENTOR.
George R. McIntosh
BY
ATTORNEY Aug. 12, 1947.    G. R. McINTOSH    2,425,631
MOTOR VEHICLE
Original Filed Oct. 3, 1942    2 Sheets-Sheet 2
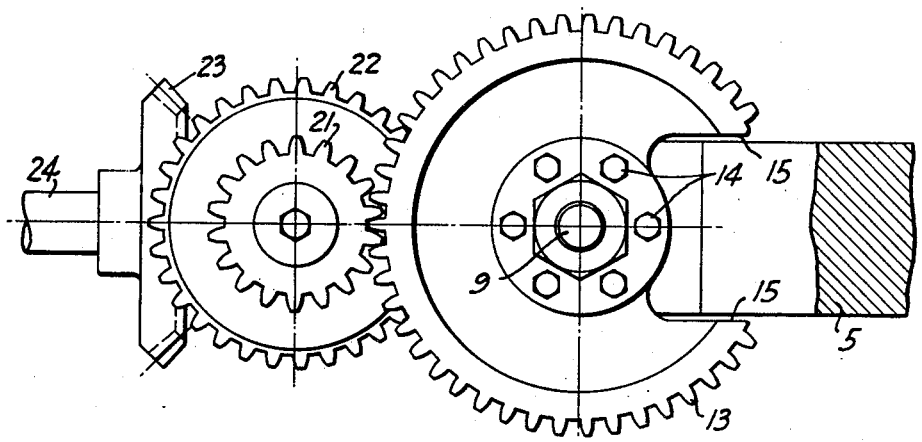
FIG_4_
FIG_5_
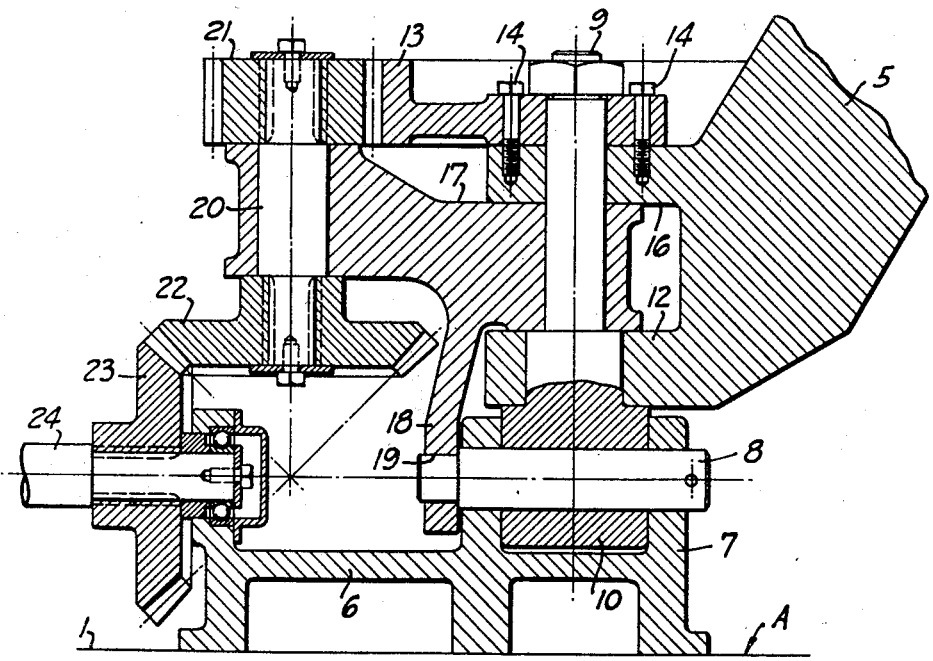
INVENTOR.
George R. McIntosh
BY
ATTORNEY Patented Aug. 12, 1947

2,425,631

UNITED STATES PATENT OFFICE 2,425,631

MOTOR VEHICLE

George R. McIntosh, San Francisco, Calif., assignor to Wooldridge Manufacturing Company, Sunnyvale, Calif., a corporation of Nevada Substituted for abandoned application Serial No. 460,711, October 3, 1942. This application November 19, 1945, Serial No. 629,512

4 Claims. (Cl. 180—79.4)

The present invention relates generally to motor vehicles and particularly to vehicles of the heavy duty type, adapted for the handling of relatively heavy loads.

In the past it has been common to provide motor vehicles with a forward power unit carrying the motor, drive gearing, and two driving wheels. The driving unit is attached to the main frame of a wheeled trailer in such a manner as to permit application of steering forces about a vertical axis. The present invention relates to motor vehicles of this type and relates particularly to mechanism for application of the desired steering forces. As will be presently explained this mechanism applies forces between the chassis of the power unit and the frame of the vehicle trailer through the instrumentality of gearing constructed and arranged in a novel manner.

In view of the foregoing a general object of the present invention is to provide a heavy duty motor vehicle having improved steering mechanism and which in particular is applicable to vehicles of the type described above.

Further objects and features of the invention will appear from the following description in which the preferred embodiment has been set forth in detail in conjunction with the accompanying drawing.

Referring to the drawing:

Figure 1 is a plan view showing a vehicle incorporating the present invention.

Figure 2 is a side elevation of the vehicle shown in Figure 1.

Figure 3 is a section taken along the line 3—3 of Figure 2.

Figure 4 is an enlarged plan view showing certain parts of the steering mechanism.

Figure 5 is a longitudinal section taken through Figure 4, portions being shown in elevation.

As illustrated in the drawing I provide a tractor or motor unit indicated generally at A, together with a trailer indicated generally at B. The trailer may be a scraper or dirt mover, or may be adapted for the transportation of various products. The motor unit consists of a chassis or frame 1 supported and driven by the two wheels 2. Figure 2 illustrates the chassis 1 extending well ahead of the wheels and carrying an engine 3 of the automotive type at its forward end. The engine is operatively connected to the wheels for driving the same, by use of conventional means such as speed reduction and differential gearing.

The trailer B consists of a suitable frame having its rear end supported by wheels 4 and having its forward end formed into a gooseneck or yoke 5 to permit the tractor wheels 2 to pass thereunder when the device is taking a sharp turn. Figure 5 illustrates how the yoke 5 is pivotally connected to the motor unit A. A base member 6 is secured to the chassis 1 and has a journal 7 for receiving a short axle or shaft 8. A king pin 9 has a hub 10 at its lower end for rotatably receiving the axle 8. Axle 8 extends at right angles to the axis of the wheels 2. The vertical axis of the king pin is preferably located directly over the axis of the tractor wheels, although in some instances it may be translated somewhat forwardly of the tractor wheel axis or to the rear of the same.

The forward end of the yoke 5 is provided with a hub 12 for rotatably receiving the king pin 9 (Figure 5). The connection is such that the motor unit A can be turned with respect to the trailer for steering purposes, the turning movement taking place about the axis of the king pin. Also the pivotal connection of the king pin on the axle 8 permits the tractor to oscillate as the wheels 2 pass over uneven ground. The king pin rocks on the axle 8 to the extent necessary to permit the tractor wheels to tilt with respect to the trailer wheels, thus permitting freedom of oscillating movement of the power unit A about a substantially horizontal axis.

A part of the load carried by the trailer is necessarily transmitted to the motor unit in the form of downward force components transmitted through axle or shaft 8, and such forces are balanced to a substantial degree by the forwardly extending chassis 11, and the engine 3 carried by the same.

The steering forces are applied by mechanism as follows:— A large gear 13 is mounted on the king pin and is attached to the trailer hub 12 by cap screws 14 (Figure 5). It will be noted that this gear is interrupted, or in other words it has a gap or recess 15 for accommodating the yoke 5. The yoke hub 12 is provided with a recess 16 serving to receive an arm 17 which is rotatably mounted on the king pin 9. Arm 17 has a depending portion 18 which is pivotally connected to the axle or shaft 8 at 19. The free end of arm 17 rotatably carries a shaft 20, which has a pinion 21 keyed thereto and which meshes with the gear 13. The other end of shaft 20 has a bevel gear 22 keyed to the same. Shaft 20 and pinion 21 are turned by a bevel gear 23 carried by a shaft 24, and which meshes with the gear 22. Shaft 24 is a steering shaft which is mounted in alignment with the axis of shaft 8. Figure 5 shows one end of shaft 24 rotatably journaled and carried by the base member 6, and Figures 1 and 2 show the other end of shaft 24 supported by a suitable bearing 25.

Suitable means can be provided for applying rotating forces to the shaft 24. For example a steering wheel 26 may control a hydraulic or air type booster indicated diagrammatically at 27 in Figure 2, this booster rotating a gear 28 in the desired direction, the gear being connected to shaft 24 for rotating it in response to manual steering forces applied to wheel 26. If desired one can mount a worm on the steering wheel column and have the same mesh directly with a worm gear (not shown) which can mesh with gear 26. Thus turning of the steering wheel 26 would directly turn the shaft 24 and pinion 21 for swinging of the motor unit about the vertical axis of the king pin.

Operation of the vehicle described above is as follows: To steer the vehicle wheel 26 is rotated in the desired direction, thus applying forces to rotate the shaft 24 together with bevel gears 22 and 23. Corresponding rotation of pinion 21 causes this pinion to travel around the large gear 13, carrying with it the arm 17. Because of the connection between arm 17 and shaft 8 (and the connection between the arm 17 and the chassis of the motor unit) the motor unit is caused to swing bodily about the vertical axis of the king pin. Figure 1 illustrates in dotted lines movement of the motor unit by application of steering forces, to a position at right angles to the longitudinal center line of the trailer B. Thus it is evident that relatively short turns can be made and in general the vehicle has a relatively high degree of maneuverability.

Steering of the vehicle does not prevent the king pin 9 from rocking on shaft 8 while the vehicle is operating on uneven ground. In other words oscillating action of the power unit is permitted about a generally horizontal axis corresponding to the axis of the shaft 8, without materially interfering with application of the desired steering forces, because this axis of oscillating movement is coincident with the axis of the shaft 24.

This application is a substitute for my application, now abandoned, Serial No. 460,711, filed October 3, 1942, for High speed carrier.

I claim:

1. In combination, a two-wheeled motor unit having a chassis with an engine for driving the wheels, the wheels serving to support the chassis and the engine, a vertically extending king pin, an axle carried by the chassis and extending longitudinally with respect to the motor unit, the lower end of the king pin being pivotally connected to the axle, a trailer having a frame with its forward end attached to the king pin, a gear fixed to the frame and having its center aligned with the vertical axis of the king pin, an arm pivoted to the king pin and having a portion attached to the horizontal axle, a pinion rotatably carried by the arm and meshing with the gear, and means for rotating the pinion in a desired direction for swinging the arm and the motor unit about the vertical axis of the king pin for steering the motor unit relative to the trailer.

2. The combination with a motor unit supported by two wheels which are rotatable about a common axis, a vertical king pin having its axis normally extending at right angles to the wheel axis, an axle carried by the motor unit and extending longitudinally of the same in a general horizontal direction, means forming a pivotal connection with the lower end of the king pin and the axle, a trailer having a frame, the forward end of the frame being attached to the king pin, an engine carried by the motor unit for driving the wheels and disposed in front of the king pin, the weight of the engine being carried by the tractor wheels, a gear fixed to the trailer frame and having its center coinciding with the axis of the king pin, an arm attached to the king pin to swing about the axis of the latter, a pinion carried by the arm and meshing with the gear, steering means for rotating the pinion causing it to move around the gear in a desired direction, and means forming an attachment between the arm and the tractor unit whereby when the arm is moved about the axis of the king pin the motor unit is moved to steer the same, said steering means including a rotatable steering shaft carried by the motor unit and disposed in alignment with said axle.

3. In a motor vehicle, a motor unit comprising a chassis supported by two aligned wheels and driven by a motor mounted upon the chassis, a trailer associated with the power unit and comprising a frame and wheels for supporting the same, a vertically extending king pin attached to the forward end of the frame, a shaft attached to the lower portion of the king pin and extending at right angles thereto, means serving to attach said shaft to the chassis of the power unit with the shaft extending in a general horizontal direction and coincident with a vertical plane extending longitudinally and centrally through the chassis, whereby the motor unit may oscillate about the axis of said shaft, a gear fixed to the frame of the trailer with its axis in alignment with the axis of the king pin, a pinion engaging said gear, means forming a journal mounting for said pinion and attached to the chassis of the power unit, whereby when the pinion progresses about the gear by virtue of turning movement, the power unit is caused to turn about the vertical axis of the king pin, a steering shaft journaled upon the chassis and extending in alignment with the axis of the first named shaft, gearing serving to connect said shaft with said pinion whereby said pinion is turned in response to turning movement of the steering shaft, and means for applying rotating forces to said shaft.

4. In a motor vehicle, a motor unit comprising a chassis supported by two aligned wheels and driven by a motor mounted upon the chassis, a trailer associated with the power unit and comprising a frame and wheels for supporting the same, a vertically extending king pin journalled to the forward end of the frame, means forming an attachment between the lower end of the king pin and the chassis, said means permitting oscillating movement of the chassis relative to the frame and king pin about an axis extending in a general horizontal direction and coincident with a vertical plane extending longitudinally and centrally through the chassis, a gear fixed to the frame of the trailer with its axis in alignment with the axis of the king pin, a pinion engaging said gear, a structure forming a journal mounting for said pinion, means forming a pivotal torque transmitting attachment between said structure and said chassis on an axis aligned with the last named axis but spaced from the vertical axis of the king pin, a steering shaft journalled upon the chassis on an axis aligned with said first named axis, gearing serving to connect said shaft with said pinion whereby said pinion is turned with respect to turning movement of the steering shaft and means for applying rotating forces to said shaft.

GEORGE R. McINTOSH.

REFERENCES CITED

The following references are of record in the file of this patent:

UNITED STATES PATENTS

| Number | Name | Date |
|---|---|---|
| 1,877,126 | Greer | Sept. 13, 1932 |
| 2,219,533 | Ross | Oct. 29, 1940 |
| 2,233,193 | Armington et al. | Feb. 25, 1941 |